(12) United States Patent
Miyazaki et al.

(10) Patent No.: US 10,788,703 B2
(45) Date of Patent: Sep. 29, 2020

(54) FRAME, SURFACE LIGHT SOURCE DEVICE, DISPLAY DEVICE AND ELECTRONIC DEVICE

(71) Applicant: Omron Corporation, Kyoto (JP)

(72) Inventors: Shinji Miyazaki, Saitama (JP); Masakazu Komano, Nara (JP); Kazuhide Hirota, Shiga (JP); Koichi Takemura, Saitama (JP); Kazunori Harada, Saitama (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/476,152

(22) PCT Filed: Feb. 27, 2018

(86) PCT No.: PCT/JP2018/007250
§ 371 (c)(1),
(2) Date: Jul. 5, 2019

(87) PCT Pub. No.: WO2018/163914
PCT Pub. Date: Sep. 13, 2018

(65) Prior Publication Data
US 2019/0353960 A1   Nov. 21, 2019

(30) Foreign Application Priority Data
Mar. 9, 2017   (JP) ................. 2017-044752

(51) Int. Cl.
*F21V 7/04*     (2006.01)
*G02F 1/13357*  (2006.01)
*G02F 1/1335*   (2006.01)

(52) U.S. Cl.
CPC .. *G02F 1/133603* (2013.01); *G02F 1/133512* (2013.01); *G02F 1/133606* (2013.01); *G02F 1/133608* (2013.01)

(58) Field of Classification Search
CPC .................. F21S 2/00; F21V 15/01; G02F 1/1333–133617
(Continued)

(56) References Cited

U.S. PATENT DOCUMENTS 8,864,358 B2 * 10/2014 Nambu ................ G02B 6/0031
                                                          362/511
2005/0168997 A1  8/2005 Lin
(Continued)

FOREIGN PATENT DOCUMENTS

JP     2002-140915 A    5/2002
JP     2012-59372 A     3/2012
(Continued)

OTHER PUBLICATIONS

International Search Report issued in Application No. PCT/JP2018/007250, dated May 1, 2018 (1 page).
(Continued)

*Primary Examiner* — Jason M Han
(74) *Attorney, Agent, or Firm* — Osha Liang LLP

(57) ABSTRACT

A frame includes a resin frame which surrounds at least a part of the side faces of a light guide plate; a reflection diffusion material which is added in the resin frame and reflects and diffuses light; and an absorption material which is added in the resin frame and absorbs light. The reflectance of the resin frame is equal to or greater than 30% and equal to or smaller than 80%.

7 Claims, 5 Drawing Sheets

(58) Field of Classification Search
USPC .............................. 362/632–634; 349/58–60
See application file for complete search history.

(56) References Cited

U.S. PATENT DOCUMENTS

| | | | |
|---|---|---|---|
| 2008/0014376 A1* | 1/2008 | Horio | C08K 5/0041 428/1.6 |
| 2012/0063167 A1 | 3/2012 | Ozawa et al. | |
| 2013/0135898 A1 | 5/2013 | Horikawa et al. | |
| 2014/0354918 A1 | 12/2014 | Ozawa et al. | |

FOREIGN PATENT DOCUMENTS

| | | |
|---|---|---|
| JP | 2013-114811 A | 6/2013 |
| WO | 2005/103159 A1 | 11/2005 |

OTHER PUBLICATIONS

Written Opinion issued in International Application No. PCT/JP2018/007250, dated May 1, 2018 (3 pages).

\* cited by examiner

FIG. 4

| | COMPARATIVE EXAMPLE 1 | EXAMPLE 1 | EXAMPLE 2 | EXAMPLE 3 | EXAMPLE 4 | EXAMPLE 5 | EXAMPLE 6 | COMPARATIVE EXAMPLE 2 |
|---|---|---|---|---|---|---|---|---|
| TONE | BLACK | GRAY 1 | GRAY 2 | GRAY 3 | GRAY 4 | GRAY 5 | GRAY 6 | WHITE |
| PIGMENT | ABSORPTION MATERIAL | REFLECTION DIFFUSION MATERIAL + ABSORPTION MATERIAL | | | | | | REFLECTION DIFFUSION MATERIAL |
| REFLECTANCE [%] | 5.7 | 34.0 | 46.5 | 52.7 | 56.0 | 61.6 | 77.8 | 94.9 |
| LIGHT SHIELDING DEGREE OF 0.5 mm THICK PLATE TYPE MOLDED PRODUCT | 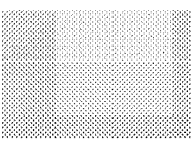 | 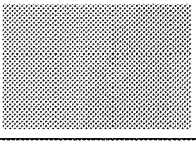 | 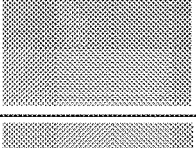 | 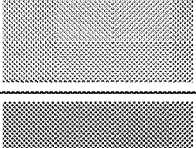 | 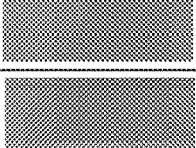 | 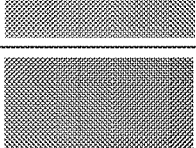 |  | 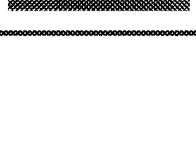 |
| LIGHT SHIELDING DEGREE OF 0.2 mm THICK PLATE TYPE MOLDED PRODUCT | 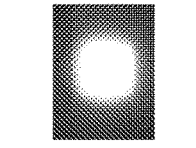 | 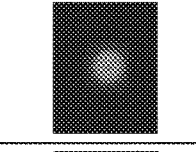 | 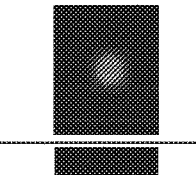 | 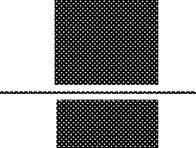 | 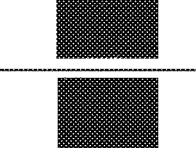 | | | |
| RELATIVE BRIGHTNESS [%] | 89.0 | 90.4 | 94.0 | 94.4 | 95.3 | 96.1 | 98.7 | 100.0 |

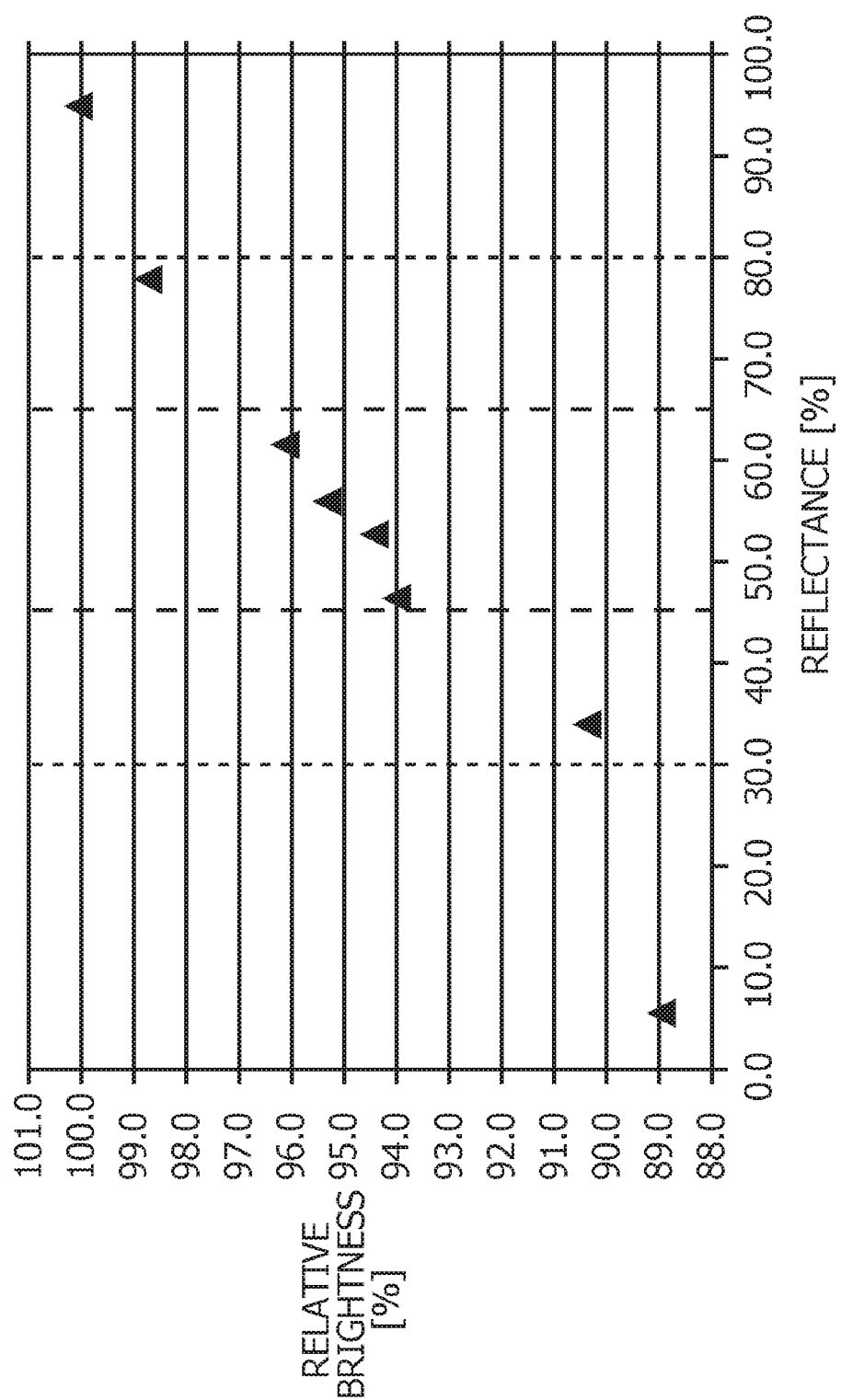

FRAME, SURFACE LIGHT SOURCE DEVICE, DISPLAY DEVICE AND ELECTRONIC DEVICE

TECHNICAL FIELD

The present invention relates to a frame, a surface light source device, a display device and an electronic device.

BACKGROUND ART

In recent years electronic devices are becoming progressively more compact and slim. A liquid crystal display device installed in such an electronic device is also demanded to have a narrower frame and thinner shape in order to acquire a larger display region using a same area. For a backlight of a display panel, a side light type (also called edge light type) surface light source device, which includes a light-emitting diode (LED) package for emitting white light as a light source and uses a light guide plate (also called light guide), is used. The surface light source device includes a frame which shields or reflects light that leaks from the side faces of the light guide plate. Concerning the above mentioned technique, a surface light source device, which includes a resin frame made of polycarbonate resin (surface reflectance at least 90° %), is proposed (see Patent Document 1).

CITATION LIST

Patent Document

[Patent document 1] Japanese Patent Application Publication No. 2002-140915

SUMMARY OF INVENTION

Technical Problem

To meet the demands for a narrower frame of the surface light source device, the thickness of the frame surrounding the side faces of the light guide plate is decreasing. The frame shields or reflects the light leaking from the side faces of the light guide plate, but if the thickness of the frame decreases in the side face directions of the light guide plate, the light that leaked from the side faces of the light guide plate may transmit through the frame. If the light transmits through the frame, the side faces of the surface light source device appear to shine because of the leakage of the light from the side face of the surface light source device.

With the foregoing in view, it is an object of the present invention to provide a technique to improve the light shielding properties of the frame.

Means for Solving the Problems

In the present invention, the following means is adopted in order to solve the problem described above. Specifically, the present invention is a frame, including: a resin frame which surrounds at least a part of the side faces of a light guide plate; a reflection diffusion material which is added in the resin frame and reflects and diffuses light; and an absorption material which is added in the resin frame and absorbs light, wherein the reflectance of the resin frame is equal to or greater than 30? and equal to or smaller than 80%.

According to the frame of the present invention, a part of the light that leaked from the side faces of the light guide plate is reflected by the reflection diffusion material, and enters into the light guide plate again, and the part of the light that leaked from the side faces of the light guide plate enters into the resin frame. The light that entered into the resin frame contacts the reflection diffusion material, and is propagated in a state of being widely diffused inside the resin frame, and is absorbed by the absorption material. Since the light that leaked from the side faces of the light guide plate is reflected, diffused and absorbed by the frame, the light shielding properties of the frame improves.

In the frame according to the present invention, the reflectance of the resin frame may be equal to or greater than 45% and equal to or smaller than 65%. In the frame according to the present invention, the reflection diffusion material may be white pigment, and the absorption material may be black pigment. In the frame according to the present invention, the reflection diffusion material may be titanium oxide, and the absorption material may be carbon.

The surface light source device according to the present invention includes: the frame according to the present invention; a light guide plate housed in the frame; and a light source which is housed in the frame and which causes light to enter the light guide plate from a side face thereof. Since this surface light source device includes the frame having improved light shielding properties, the present invention can provide a surface light source device in which the leakage of light is suppressed. A display device according to the present invention includes: the surface light source device according to the present invention; and a display panel which receives light emitted from the surface light source device. Since this display device includes the frame having improved light shielding properties and the surface light source device, the present invention can provide a display device in which the leakage of light is suppressed. An electronic device according to the present invention includes the display device according to the present invention. Since this electronic device includes the frame having improved light shielding properties, the surface light source device and the display device, the present invention can provide an electronic device in which the leakage of light is suppressed.

ADVANTAGEOUS EFFECTS OF INVENTION

According to the present invention, the light shielding properties of the frame can be improved.

FIG. 4 is a table indicating the evaluation results of the light shielding properties and optical characteristics.

FIG. 5 is a graph indicating the evaluation results of the light shielding properties and optical characteristics.

DESCRIPTION OF EMBODIMENTS

Hereinafter, an embodiment of the present invention will be described with reference to the drawings. It is to be understood that the embodiment described below merely represents an example of implementing the present invention and is not intended to limit the present invention to the specific configurations described hereinafter.

In the embodiment described below, the "display device" will be described as a liquid crystal display device and the "planar light source apparatus" will be described as a backlight of the liquid crystal display device. The "planar light source apparatus" can be used for applications other than a backlight such as a front light arranged in a front surface of a display panel or an electronic paper-based display device.

The liquid crystal display device according to the embodiment will be described with reference to the drawings.

(Configuration of Liquid Crystal Display Device)

Figure 1:
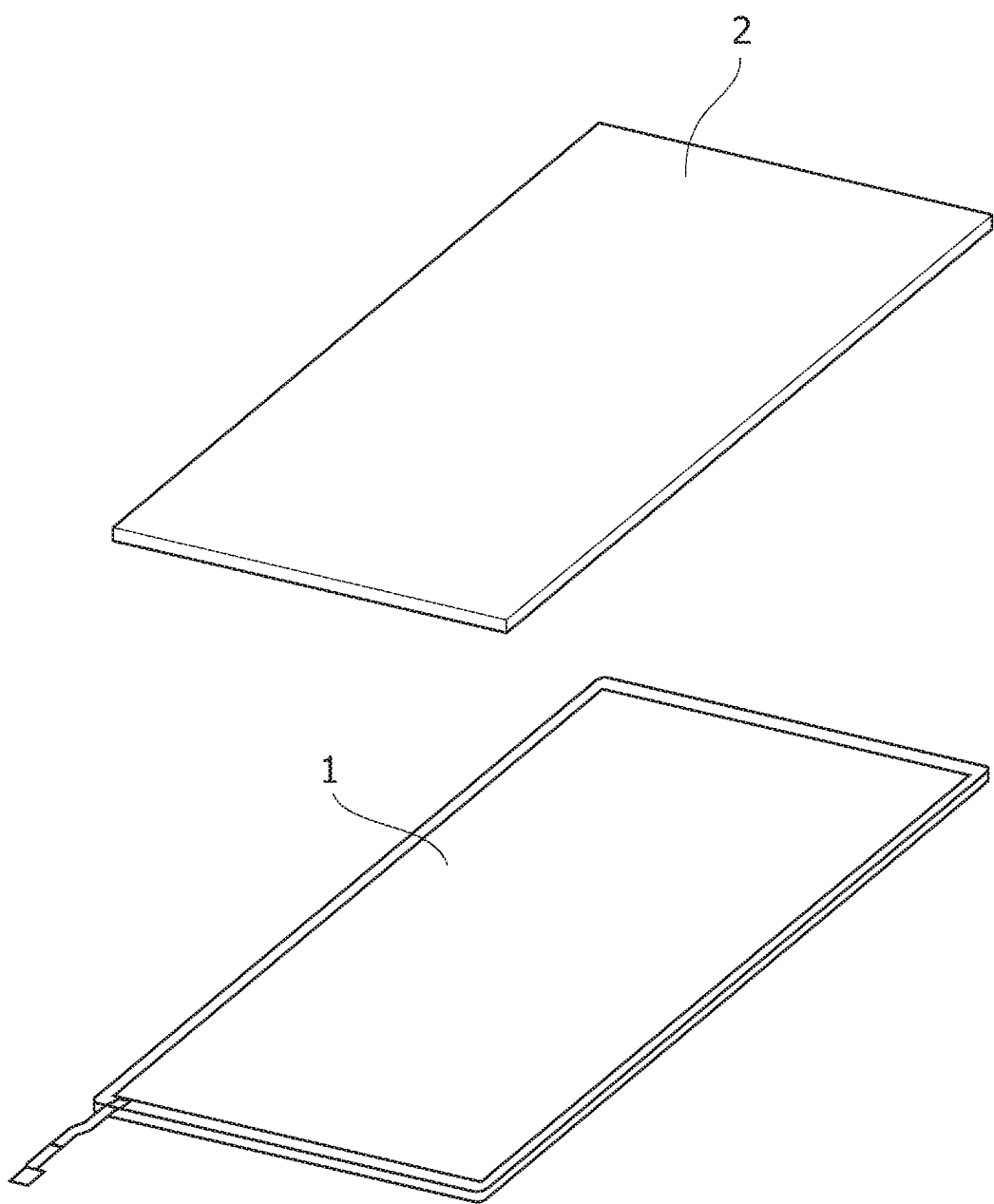
FIG. 1 is a perspective view depicting an example of the configuration of a liquid crystal display device according to an embodiment.

FIG. 1 is a perspective view illustrating a configuration of a liquid crystal display device according to the embodiment. As shown in FIG. 1, the liquid crystal display device includes: a planar light source apparatus 1 arranged as a backlight; and a display panel 2 which receives light emitted from the planar light source apparatus 1. The display panel 2 displays images by applying voltage to liquid crystals encapsulated by being sandwiched between glass plates and increasing or reducing transmittance of light. Hereinafter, in the planar light source apparatus 1, a side of the display panel 2 may be described as an upper surface side and a side of an opposite surface thereto may be described as a lower surface side.

(Configuration of Surface Light Source Device 1)

Figure 2:
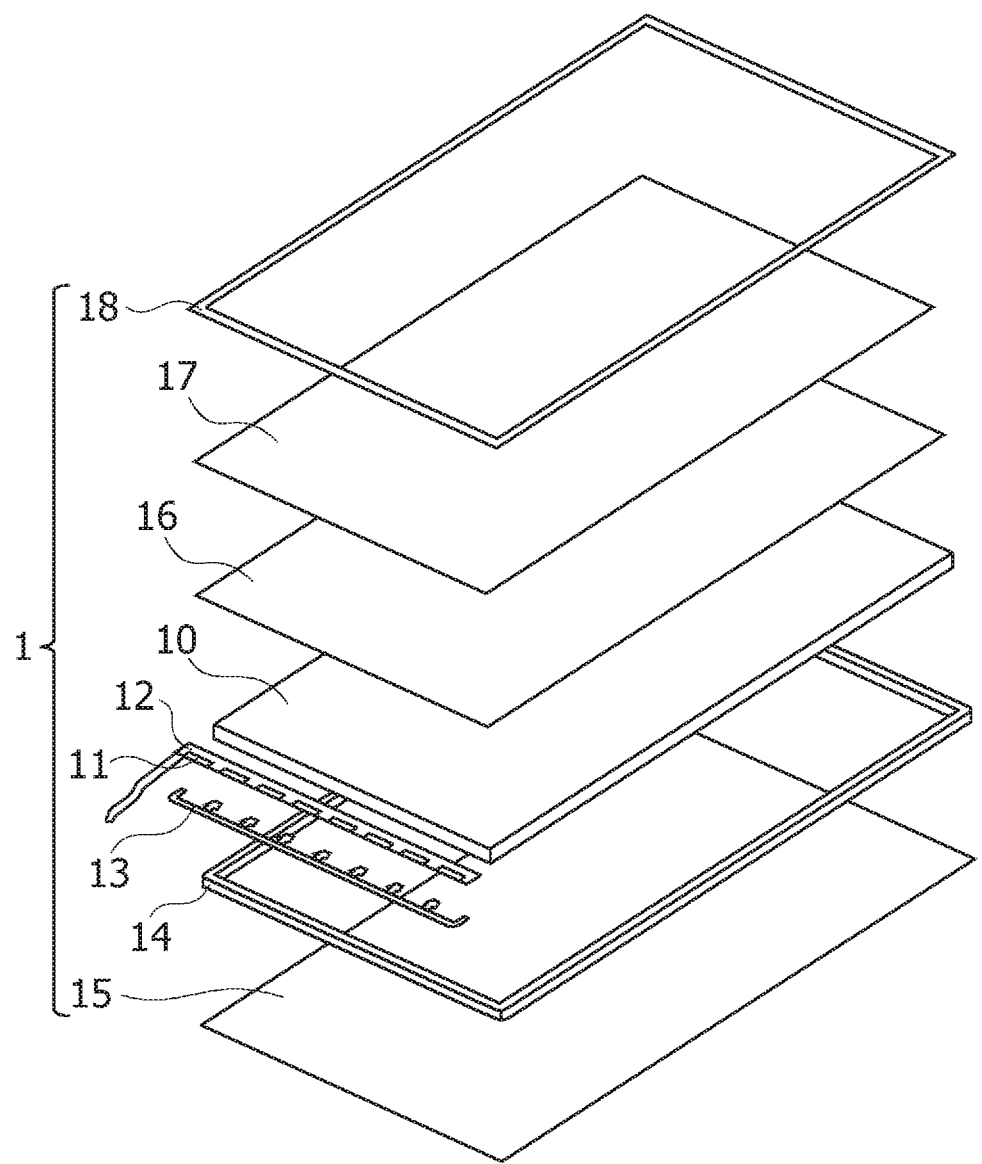
FIG. 2 is a perspective view depicting an example of a configuration of a surface light source device according to the embodiment.

FIG. 2 is a perspective view depicting an example of a configuration of the surface light source device 1 according to the embodiment. The surface light source device 1 according to the embodiment includes a light guide plate 10, a light source 11, a flexible printed circuit board (hereafter also called "FPC") 12, a fixing member 13 and a frame 14. The surface light source device 1 also includes: a reflection sheet 15 which is disposed on the lower surface side of the light guide plate 10; a diffusion sheet 16; a prism sheet 17; and a double sided light shielding tape 18 which is layered on the light guide plate 10 on the upper surface side.

The light guide plate 10 has an approximately flat plate shape and is molded from a translucent material such as a polycarbonate resin or a polymethyl methacrylate resin. An upper surface of the light guide plate 10 is a light exit surface from which light is emitted and which faces the display panel 2. The light guide plate 10 is configured such that light incident into the light guide plate 10 is guided to the light exit surface and the entire light exit surface is uniformly lighted. The light guide plate 10 may include a light guide plate main body, and a light guide unit of which height is higher than the light guide plate main body. The light emitted from the light source 11 efficiently enters the light guide plate main body through the light guide unit, whereby the light utilization efficiency of the light guide plate 10 improves. Since the light guide plate main body is thinner than the light guide unit, the surface light source device 1 becomes thinner, and the liquid crystal display device, which includes the surface light source device 1, becomes thinner. The light guide plate 10 according to the embodiment, however, may have a flat plate shape that does not includes the light guide unit.

The light source 11 emits white light from a light-emitting surface. While the light source 11 is, for example, an LED package, a light source other than an LED package may be used instead. The light source 11 is formed by encapsulating an LED chip that is a light emitting element with a translucent resin (resin layer) containing phosphor. The light source 11 is driven by the power received from the FPC 12 and is turned ON. For the light source 11, an LED light source that emits light other than white light may be used. The light source 11 is mounted on the FPC 12 such that the light-emitting surface of the light source 11 faces the light entry surface of the light guide plate 10. For example, a plurality of light sources 11 are mounted on the FPC 12 in a row with predetermined intervals.

The FPC 12 is a circuit board configured by disposing wiring by conductive foil on a base material, which is a flexible insulating film, and adhering a cover lay or resin (photosensitive resin), which is an insulating film for protection, on the surface of the wiring. The wiring is disposed on the FPC 12. The wiring of the FPC 12 is used to simply power the light source 11, for example. The fixing member 13 is disposed on the lower surface of the FPC 12, and fixes the FPC 12 to the light guide plate 10. The fixing member 13 is, for example, a double sided adhesive tape of which both the upper and lower surfaces are adhesive faces.

The frame 14 houses the light guide plate 10, the light source 11, the FPC 12, the fixing member 13, the reflection sheet 15, the diffusion sheet 16 and the prism sheet 17. The frame 14 may be a frame body (frame-shaped member) that surrounds the side faces of the light guide plate 10, or may be a box body (box-shaped member) which includes a frame body surrounding the side faces of the light guide plate 10 and a bottom plate on which the frame body stands. The frame body may be formed by a four-sided side wall member, or a circular side wall member having an opening, or an elliptical side wall member having an opening. Each corner of the four-sided side wall member of the frame body may have a right angle shape, or each corner of the four-sided side wall member of the frame body may be rounded.

The reflection sheet 15 is disposed so as to contact the lower surface of the light guide plate 10. The lower surface of the light guide plate 10 is a surface on the opposite side of the upper surface of the light guide plate 10. The reflection sheet 15 is a high reflection film having a multi-layer film structure, a white resin sheet having high reflectance, or a smooth sheet constituted of metal foil, for example, and reflects light so that the light inside the light guide plate 10 does not leak from the lower surface of the surface light source device 1. If the frame 14 is a box body having a frame body and a bottom plate, the reflection sheet 15 is disposed between the light guide plate 10 and the bottom plate of the frame 14.

On the light guide plate 10, the diffusion sheet 16 and one or two prism sheets 17 are disposed. The diffusion sheet 16 is a semitransparent resin film, and diffuses light emitted from the light exit surface of the light guide plate 10, so as to widen the directional characteristics of the light. The prism sheet 17 is a transparent resin film on which triangular prism-shaped micro patterns are formed on the upper surface, condenses light diffused by the diffusion sheet 16, and increases brightness when the surface light source device 1 is viewed from the upper surface side. The double sided light shielding tape 18 is a black adhesive tape of which both upper and lower surfaces are adhesive surfaces. The double sided light shielding tape 18 has a frame shape (ring shape). The double sided light shielding tape 18 is disposed around the outer periphery of the frame 14, and suppresses the leakage of light from the surface light source device 1.

(Configuration of Frame 14)

A part or all of the frame 14 is made of resin material. The resin frame includes polycarbonate resin, which is a base material of the resin frame, a reflection diffusion material which reflects and diffuses light, and an absorption material which absorbs light. The reflection diffusion material and the adsorption material are added to the polycarbonate resin.

This means that the reflection diffusion material and the absorption material are added to the resin frame. For the base material of the resin frame, a resin other than polycarbonate resin may be used. The reflection diffusion material is white pigment such as titanium oxide, for example. The absorption material is black pigment such as carbon, for example. The resin frame may be manufactured by forming pellets, which include polycarbonate resin, the reflection diffusion material and the absorption material, into a desired shape by injection molding.

Figure 3:
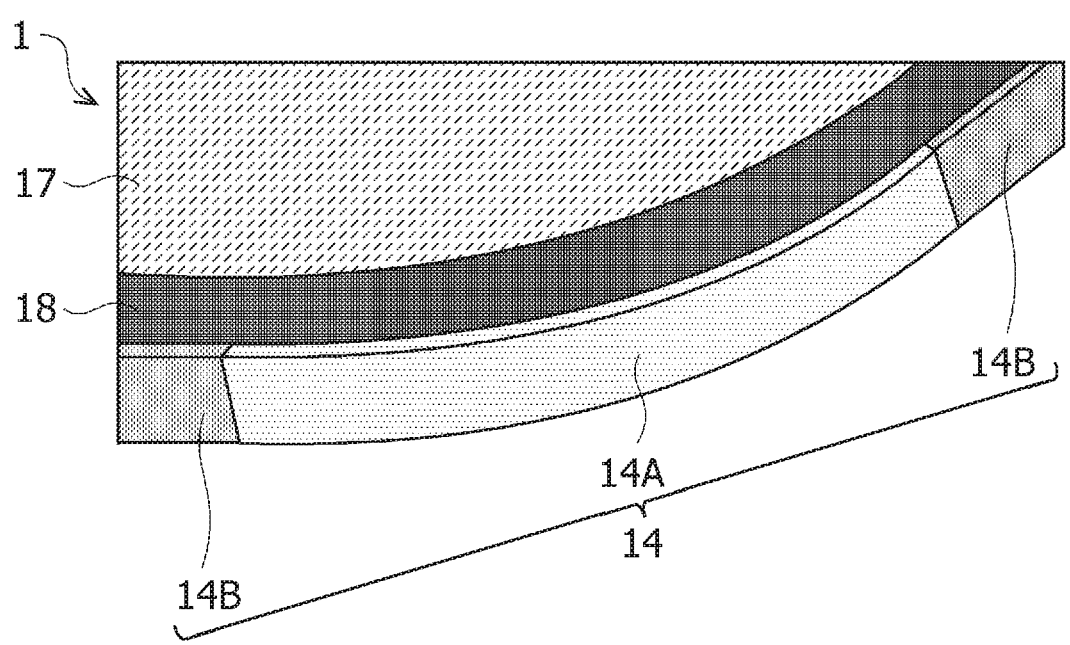
FIG. 3 is a perspective view depicting an example of the surface light source device according to the embodiment.

FIG. 3 is a perspective view depicting an example of the surface light source device 1 according to the embodiment. As illustrated in FIG. 3, a part of the frame 14 may be formed as a resin frame 14A, and another part of the frame 14 may be formed as a metal frame 14B. In other words, the frame 14 may include the resin frame 14A and the metal frame 14B. The resin frame 14A may surround a part of the side faces of the light guide plate 10, and the metal frame 14B may surround another part of the side faces of the light guide plate 10 that is not surrounded by the resin frame 14A. The resin frame 14A and the metal frame 14B may be connected. The resin frame 14A and the metal frame 14B may overlap in the side face direction of the light guide plate 10. The rounded corner portions of the frame body of the frame 14 may be the resin frame 14A, and the portion other than the corner portions of the frame body of the frame 14 may be the metal frame 14B.

The light emitted from the light source 11 enters into the light guide plate 10 and propagates inside the light guide plate 10 while repeating total reflection by the upper surface and the lower surface of the light guide plate 10, and is emitted through the upper surface of the light guide plate 10. In some cases, a part of the light propagating inside the light guide plate 10 may leak from the side faces of the light guide plate 10. The frame 14, which includes the reflection diffusion material and the absorption material, reflects, diffuses and absorbs the light. The light that is leaked from the side faces of the light guide plate 10 is reflected and diffused by the reflection diffusion material of the frame 14, and is absorbed by the absorption material of the frame 14. In other words, a part of the light that is leaked from the side faces of the light guide plate 10 is reflected by the reflection diffusion material of the frame 14, and enters into the light guide plate 10 again, and another part of the light that is leaked from the side faces of the light guide plate 10 enters into the frame 14. The light that entered into the frame 14 contacts the reflection diffusion material of the frame 14, and propagates in a state of being diffused in a wide range inside the frame 14, and is absorbed by the absorption material of the frame 14. The light that entered into the frame 14 is also reflected by the reflection diffusion material of the frame 14, and enters into the light guide plate 10 again.

For example, a frame, in which a material to reflect and diffuse light is added but a material to absorb light is not added, reflects and diffuses light but does not absorb light. Therefore in the case of a frame in which a material to reflect and diffuse light is added but a material to absorb light is not added, the reflectance of the frame is high, but when the thickness of the frame in the side face direction of the light guide plate 10 decreases, light transmits through the frame, and the light leaked from the side faces of the light guide plate 10 cannot be shielded. For example, in the case of a frame in which a material to absorb light is added but a material to reflect and diffuse light is not added, light is absorbed but light is not reflected and diffused. Therefore reflectance of the frame, in which a material to absorb light is added but a material to reflect and diffuse light is not added, is low. The frame 14, which includes the reflection diffusion material and the absorption material, reflects and diffuses light and absorbs light, hence light that leaked from the side surfaces of the light guide plate 10 can be shielded while maintaining high reflectance of the frame 14. Thus the frame 14, which includes the reflection diffusion material and the absorption material, improves the light shielding properties of the frame 14.

(Evaluation Result)

FIG. 4 and FIG. 5 indicate the light shielding properties evaluation result of Examples 1 to 6 of the embodiment and Comparative Examples 1 and 2, and the optical characteristics evaluation result of Examples 1 to 6 of the embodiment and Comparative Examples 1 and 2. In Examples 1 to 6, a resin in which the reflection diffusion material and absorption material are added is used. In Comparative Example 1, a resin in which the absorption material is added but the reflection diffusion material is not added is used. In Comparative Example 2, a resin in which the reflection diffusion material is added but the absorption material is not added is used. To evaluate the light shielding properties, each resin according to Examples 1 to 6 and Comparative Examples 1 and 2 is processed to be a plate type molded product having a predetermined thickness, and the light of the LEDs is irradiated to the plate type molded product, whereby the light shielding properties are evaluated. To evaluate the optical characteristics evaluation method, each resin according to Examples 1 to 6 and Comparative Examples 1 and 2 is used as the resin frame of the backlight unit (surface light source device), and the optical characteristics thereof are measured.

The evaluation results in FIG. 4 and FIG. 5 will be described. For each resin according to Examples 1 to 6 and Comparative Examples 1 and 2, the reflectance (%) at 500 nm is measured using the Specular Component Include (SCI) method. The SCI method is a method of measuring the total of the regular reflection light and diffusion reflection light. Using each resin according to Examples 1 to 6 and Comparative Examples 1 and 2 for the resin frame of the backlight unit, the brightness of each backlight unit of Examples 1 to 6 and Comparative Examples 1 and 2 is measured. Based on the brightness of the backlight unit of Comparative Example 2, the relative brightness (° %) of each backlight unit of Examples 1 to 6 and Comparative Example 1 is calculated.

The column of the "light shielding degree of 0.5 mm thick plate type molded product" in FIG. 4 indicates a state of the opposite side of a portion of the 0.5 mm thick plate type molded product where the light of LEDs is irradiated. The column of the "light shielding degree of 0.2 mm thick plate type molded product" in FIG. 4 indicates a state of the opposite side of a portion of the 0.2 mm thick plate type molded product where the light of LEDs is irradiated. Each non-black portion in the columns of the "light shielding degree of 0.5 mm thick plate type molded product" and the "light shielding degree of 0.2 mm thick plate type molded product" in FIG. 4 indicates the light transmitted through the plate type molded product. The abscissa in FIG. 5 indicates the reflectance (%) of the plate molded product, and the ordinate in FIG. 5 indicates the relative brightness (%) of the backlight unit. In FIG. 5, the reflectance (%) of the plate type molded product and the relative brightness (%) of the backlight unit of the Comparative Example 1, Examples 1 to 6 and Comparative Example 2 are plotted sequentially from the left.

As indicated in FIG. 4, the reflectance of the plate type molded product of Comparative Example 1 is 5.7%, and the reflectance of each plate type molded product of Examples 1 to 6 is in a range of equal to or greater than 34.0% and equal to or smaller than 77.8%. The reflectance of the plate type molded product of Comparative Example 1 is low since the reflection diffusion material is not added in the plate type molded product of Comparative Example 1. The reflection diffusion material is added in the plate type molded products of Examples 1 to 6, hence the reflectances of the plate type molded products of Examples 1 to 6 are higher than the reflectance of the plate type molded product of Comparative Example 1. As the evaluation results in FIG. 4 and FIG. 5 indicate, the reflectance of the plate type molded product in which the reflection diffusion material and the absorption material are added is higher than the reflectance of the plate type molded product in which the absorption material is added but the reflection diffusion material is not added.

As indicated in FIG. 4, the relative brightness of the backlight unit of Comparative Example 1 is 89.0%, and the relative brightness of each backlight unit of Examples 1 to 6 is in a range of equal to or greater than 90.4% and equal to or smaller than 98.7%. The relative brightness (%) of each backlight unit of Examples 1 to 6 is higher than the relative brightness (%) of the backlight unit of Comparative Example 1. Therefore as indicated in the evaluation results of FIG. 4 and FIG. 5, the brightness of the backlight unit using the resin frame in which the reflection diffusion material and the absorption material are added is higher than the brightness of the backlight using the resin frame in which the absorption material is added but the reflection diffusion material is not added.

In the plate type molded product of Comparative Example 1, the absorption material is added but the reflection diffusion material is not added. As indicated in the columns of the "light shielding degree of 0.5 mm thick plate type molded product" and the "light shielding degree of 0.2 mm thick plate type molded product" of the Comparative Example 1 in FIG. 4, the light transmits through the plate type molded product of Comparative Example 2. In the plate type molded products of Examples 1 to 6, the reflection diffusion material and the absorption material are added, therefore the plate type molded products of Examples 1 to 6 reflect, diffuse and absorb light. As indicated in the column of the "light shielding degree of 0.5 mm thick plate type molded product" of Examples 1 to 4 in FIG. 4, the light does not transmit through the plate type molded products of Examples 1 to 4. Further, as indicated in the "light shielding degree of 0.2 mm thick plate type molded product" of Example 1 of FIG. 4, the light does not transmit through the plate type molded product of Example 1. As indicated in the column of the "light shielding degree of 0.5 mm thick plate type molded product" of Examples 5 and 6 in FIG. 4, the quantity of light that transmits through each plate type molded product of Examples 5 and 6 is less than the quantity of light that transmits through the plate type molded product of Comparative Example 1. Further, as indicated in the column of the "light shielding degree of 0.2 mm thick plate type molded product" of Example 2 to 4 in FIG. 4, the quantity of light that transmits through each plate type molded product of Examples 2 to 4 is less than the quantity of light that transmits through the plate type molded product of Comparative Example 1. Therefore as indicated in the evaluation results in FIG. 4, the light shielding properties of the plate type molded product, in which the reflection diffusion material and the absorption material are added, is better than the light shielding properties of the plate type molded product in which only the absorption material is added.

In the plate type molded product of Comparative Example 2, the absorption material is not added, hence the plate type molded product of Comparative Example 2 does not absorb light. Therefore as indicated in the column of the "light shielding degree of 0.5 mm thick plate type molded product" of Comparative Example 2 in FIG. 4, the light transmits through the plate type molded product of Comparative Example 2, and the quantity of light that transmits through the plate type molded product of Comparative Example 2 is high. Further, as indicated in the "light shielding degree of 0.5 mm thick plate type molded product" of Examples 1 to 4 in FIG. 4, the light does not transmit through the plate type molded products of Examples 1 to 4. As indicated in the "light shielding degree of 0.5 mm thick plate type molded product" of Example 5 and 6 and Comparative Example 2 in FIG. 4, the quantity of light that transmits through each plate molded product of Examples 5 and 6 is much less than the quantity of light that transmits through the plate type molded product of Comparative Example 2. Therefore, as indicated in the evaluation results in FIG. 4, the light shielding properties of the plate type molded product, in which the reflection diffusion material and the absorption material are added, is better than the light shielding properties of the plate type molded product in which only the reflection diffusion material is added.

As indicated in the evaluation results of FIG. 4 and FIG. 5, in terms of improving the light shielding properties of the plate type molded product, the reflectance of the plate type molded product is preferably equal to or greater than 30% and equal to or smaller than 80%. The light shielding properties of the frame 14 according to the embodiment can be evaluated in the same manner as the light shielding properties of the plate type molded products of Examples 1 to 6. Therefore in terms of improving the light shielding properties of the frame 14, the reflectance of the frame 14 is preferably equal to or greater than 30% and equal to or smaller than 80%. If focus is on implementing good light shielding properties of the frame 14, it is preferable that the reflectance of the frame 14 is around 30%.

As indicated in the evaluation results in FIG. 4 and FIG. 5, in terms of balancing the light shielding properties of the plate type molded products of Examples 1 to 6 and the brightness of the backlight units of Example 1 to 6, the reflectance of the plate type molded product is preferably equal to or greater than 45% and equal to or smaller than 65%. The brightness of the surface light source device 1 according to the embodiment can be evaluated in the same manner as the brightness of the backlight units of Examples 1 to 6. Therefore in terms of balancing the light shielding properties of the frame 14 and the brightness of the surface light source device 1, the reflectance of the frame 14 is preferably equal to or greater than 45% and equal to or smaller than 65%. If focus is on implementing good brightness of the surface light source device 1, it is preferable that the reflectance of the frame 14 is around 800/o.

According to the embodiment, the frame 14 includes the resin, the reflection diffusion material that reflects and diffuses light, and the absorption material that absorbs the light, therefore the light shielding properties of the frame 14 improves. Since the surface light source device 1 includes the frame 14 having improved light shielding properties, the light leakage from the surface light source device 1 can be suppressed while maintaining a high brightness of the surface light source device 1. By installing this surface light source device 1 in the liquid crystal display device, a liquid crystal display device, in which the light shielding properties of the frame 14 is improved and the light leakage from the surface light source device 1 is suppressed, can be provided. This liquid crystal display device can be installed in various electronic devices. By installing this liquid crystal display device in an electronic device, an electronic device, in which the light shielding properties of the frame 14 is improved and light leakage from the liquid crystal display device is suppressed, can be provided. Examples of such electronic devices which includes this liquid crystal display device are: a smartphone, a digital camera, a tablet terminal, an electronic book reader, a wearable apparatus, a car navigation apparatus, an electronic dictionary and an electronic bulletin board.

REFERENCE SIGNS LIST

1 Area light source apparatus
2 Display panel
10 Light guide plate
11 Light source
12 FPC
13 Fixing member
14 Frame
15 Reflection sheet
16 Diffusion sheet
17 Prism sheet
18 Double sided light shielding type

The invention claimed is:

1. A frame, comprising:
   a resin frame which surrounds at least a part of the side faces of a light guide plate;
   a reflection diffusion material which is added in the resin frame and reflects and diffuses light; and
   an absorption material which is added in the resin frame and absorbs light,
   wherein the reflectance of the resin frame is equal to or greater than 30% and equal to or smaller than 80%.

2. The frame according to claim 1, wherein the reflectance of the resin frame is equal to or greater than 45% and equal to or smaller than 65%.

3. The frame according to claim 1, wherein the reflection diffusion material is white pigment, and the absorption material is black pigment.

4. The frame according to claim 1,
   wherein the reflection diffusion material is titanium oxide, and the absorption material is carbon.

5. A surface light source device, comprising:
   the frame according to claim 1;
   the light guide plate housed in the frame; and
   a light source which is housed in the frame and which causes light to enter the light guide plate from a side face thereof.

6. A display device, comprising:
   the surface light source device according to claim 5; and
   a display panel which receives light emitted from the surface light source device.

7. An electronic device comprising the display device according to claim 6.

* * * * *